United States Patent
Baker et al.

[11] 3,879,616
[45] Apr. 22, 1975

[54] COMBINED STEAM TURBINE AND GAS TURBINE POWER PLANT CONTROL SYSTEM

[75] Inventors: Jack M. Baker, Greenville, S.C.; Vladimir T. Dimitroff; Lawrence R. Mizen, both of Peabody, Mass.; Russell A. Gray, Marblehead, Mass.

[73] Assignee: General Electric Company, Schenectady, N.Y.

[22] Filed: Sept. 17, 1973

[21] Appl. No.: 398,218

[52] U.S. Cl. .................. 290/40; 290/2; 60/39.18
[51] Int. Cl. .......................................... F01k 23/00
[58] Field of Search ........... 290/2, 40, 52; 60/39.18, 60/105

[56] References Cited
UNITED STATES PATENTS

| | | | |
|---|---|---|---|
| 2,663,146 | 12/1953 | Legendre | 290/2 |
| 3,097,490 | 7/1963 | Cullan et al. | 60/105 |
| 3,304,712 | 2/1967 | Pacault et al. | 60/39.18 |
| 3,421,014 | 1/1969 | Moorganov | 60/105 |
| 3,609,384 | 9/1971 | Strohmeyer | 290/40 |
| 3,667,217 | 6/1972 | Vidal | 60/39.18 |
| 3,757,517 | 9/1973 | Rigollot | 290/2 |

Primary Examiner—G. R. Simmons
Attorney, Agent, or Firm—John F. Ahern; James W. Mitchell

[57] ABSTRACT

A combined cycle power plant has a number of gas turbines each feeding exhaust gas to an associated heat recovery steam generator to generate steam which is supplied to a common header. Provision can also be made for supplementary firing of the heat recovery steam generator to produce additional steam flow. The combined cycle plant also has a steam turbine with a special control system to control steam pressure in the header and to supply the balance of the plant load. An overall combined plant control system assigns load to the individual gas turbine control systems, while the steam turbine control system controls steam pressure in the common header. The steam pressure level setpoint is ramped between selected operating pressure levels when adding or removing load, in accordance with the steam turbine valve positions, in order to achieve optimum operation of the steam turbine. A steam bypass valve control system is used to control pressure in the header during startup, and a supplementary firing control for the heat recovery steam generators may be included to achieve peak loads.

13 Claims, 8 Drawing Figures

COMBINED STEAM TURBINE AND GAS TURBINE POWER PLANT CONTROL SYSTEM

BACKGROUND OF THE INVENTION

This invention relates generally to control systems for combined steam turbine and gas turbine power plants which use heat recovery steam generators to generate steam from the gas turbine exhaust. More particularly, the invention pertains to a control system for efficient and orderly loading and unloading of the overall power plant, with division of load among the steam and gas turbines within the operating constraints imposed upon the various components within the overall system.

Combined steam turbine and gas turbine cycles, sometimes known as combined cycles, are not new. Various suggestions have been made in the prior art for achieving higher thermal efficiencies by combining steam turbines and gas turbines in various ways. Some of these have employed the gas turbine to improve the already highly efficient steam turbine reheat and regenerative feedwater heating cycle through integration of gas turbines with conventional fossil-fired boilers, as exemplified in U.S. Pat. Nos. 3,325,992 and 3,420,054, both issued to R. C. Sheldon and assigned to the present assignee. More promising, however, have been cycles using heat recovery steam generators in the gas turbine exhaust with special forced recirculation evaporators as discussed in U.S. Pat. No. 3,147,742, issued to H. F. May, and with provision for "supplementary firing" or burning of additional fuel in the gas turbine exhaust to increase the temperature of the exhaust gases as disclosed in U.S. Pat. No. 3,443,550, issued to H. F. May and J. M. Kovacik.

When such combined cycle plants are operating in the "unfired" mode, i.e., without supplementary firing, the steam generated, and hence the output of the steam turbine, is heavily dependent upon the functioning of the gas turbine(s). The gas turbine exhaust temperature and the mass flow of gas flowing through the gas turbine determine the quantity, pressure and temperature of steam generated. At part load, the exhaust temperature of the gas turbine is lower, which reduces the degree of superheat in the steam and the quantity of steam, impairing efficient operation and control of the steam turbine, as well as causing erosion in the blades. Various control schemes have been proposed for increasing the thermal efficiency of the combined cycle at part load in an unfired heat recovery steam generator, as exemplified in U.S. Pat. No. 3,150,487 I to J. Mangan et al.

U.S. Pat. No. 3,505,811 to F. A. Underwood shows a control system for a supplementary fired heat recovery steam generator in a combined cycle plant, wherein a primary controller responsive to load demand forces a programmed load split between the gas turbine and the steam turbine by controlling supplementary firing rate. In the Underwood patent, the position of the steam valve serves to continuously reset the reference setpoint of the steam header pressure as a function of power plant output so that the valve always tends to move to a wide-open position. The means for obtaining this movement of the valve to a wide-open position is by increasing or decreasing supplementary firing rate and thereby the rate of generation of steam. This type of control is applicable only when supplementary firing is employed.

Another difficult problem with combined cycle plants is the initial startup and loading of the steam turbines and generators in an efficient and orderly manner. It would be desirable to have a single control which would facilitate startup, loading or unloading of the plant. The existing condition of the plant, in terms of the temperatures of the components at the commencement of startup, limits the rate at which the plant can be loaded. The useful life of major components of a steam turbine, in particular, can be significantly reduced if the effects of changing the metal temperature are not recognized and considered. Hence, a suitable control system should start up the plant in accordance with the selected thermal constraints which give long-term turbine component life.

Accordingly, one object of the present invention is to provide an improved control system for a combined steam turbine and gas turbine plant which provides loading and unloading, with thermally efficient operation, between minimum load and maximum capability.

Another object of the invention is to provide an improved control system for a combined cycle plant providing for division of load among the steam turbine and gas turbine units in an improved manner.

Another object of the invention is to provide an improved control system for a combined cycle plant which provides for operation in the unfired mode under the most efficient conditions for both the gas turbine and the steam turbine.

Another object of the invention is to provide a control system for a combined plant which increases life of the plant components during startup, loading and unloading.

SUMMARY OF THE INVENTION

Briefly stated, the invention is practiced by assigning load for the overall plant among the gas turbines to meet load demand on the overall combined plant. The gas turbine exhausts generate steam in heat recovery steam generators connected to a common steam header. A steam turbine with a separate steam turbine control system regulates pressure in the steam header at one of several reference pressure levels, manipulating the steam turbine valves to regulate the pressure. Change up or down from one reference pressure level to another is initiated by valve movement, beyond a selected operating range. The steam turbine follows the gas turbine, in load sharing between them. When the gas turbines are carrying rated load limited by their temperatures, the plant control system initiates supplementary firing to generate more steam and the header pressure setpoint is ramped to a new higher level.

DRAWING

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DESCRIPTION OF THE PREFERRED EMBODIMENT

Overall Plant and Control System Description

Figure 1:
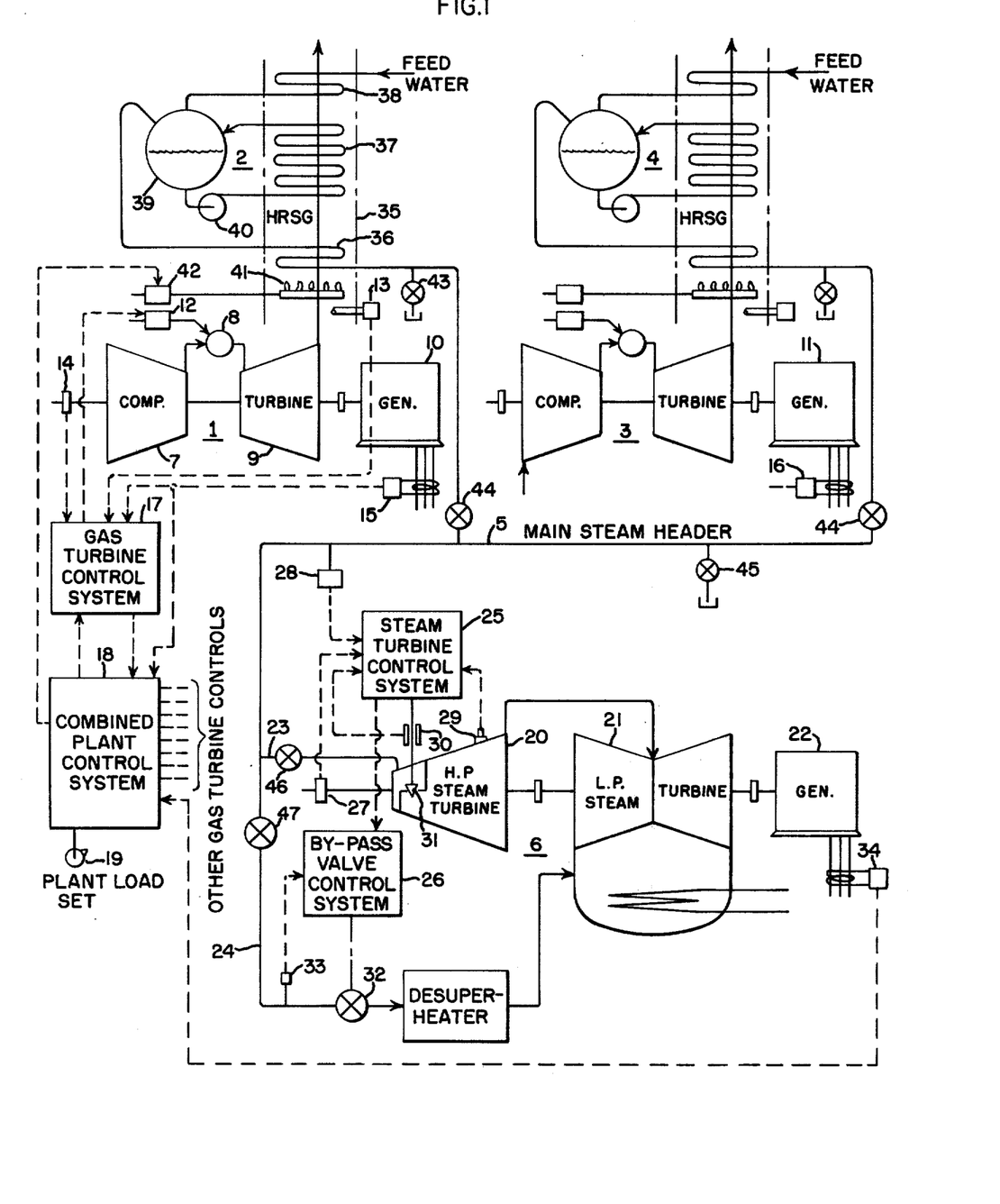
FIG. 1 is a simplified diagram of a combined cycle plant with two gas turbines and one steam turbine and portions of the plant control system.

Referring to FIG. 1 of the drawing, the major components illustrated are a first gas turbine 1 exhausting through a heat recovery steam generator 2 and a second independent gas turbine 3 exhausting through a second heat recovery steam generator 4. The two heat recovery steam generators 2, 4 (hereinafter designated HRSG) supply a common steam header 5 to which is connected a steam turbine 6. The number of gas turbines or steam turbines depend upon the designs of these components and the desired capacity of the plant. Although only two gas turbines and one steam turbine are shown in FIG. 1, a typical plant might comprise three, four, five or six gas turbines, each with its own HRSG, and a single steam turbine. In a supplementary fired plant, for example, with four gas turbines, the gas turbines might generate approximately half of the total plant power and the single steam turbine the other half. In an unfired plant, the load share of the gas turbines might be two-thirds and the steam turbine one-third.

Each gas turbine, which may be identical with the others, includes a compressor 7, a series of combustion chambers symbolically shown at 8, and a turbine section 9. The gas turbine is coupled to drive a load indicated as generator 10. Gas turbine 3 similarly drives a generator 11.

Gas turbine 1 has a complex control system which is not fully shown, but some of the basic elements include a fuel controller 12 regulating the supply of fuel to the combustion chambers, a temperature sensor 13 measuring temperature of the turbine exhaust, and a speed sensor 14 indicating shaft speed. Generator 10 is equipped with a looad transducer 15 measuring watts delivered to the electrical system. Similarly, generator 11 has a load transducer 16.

Each gas turbine has its own individual control system. Gas turbine 1, for example, has a control system 17. Gas turbine 3 has a control system (not shown) which may be identical to that shown as 17 and which is connected to its sensors, transducers and controls in a similar manner to that shown for turbine 1. All of the gas turbine control systems are under the supervision of a combined plant control system 18, and load settings are assigned to the individual gas turbine control systems by the combined plant control system in order to meet a plant load demand setting for the overall plant entered with control knob 19, or by an automatic load dispatching system.

Turning now to the steam turbine portion of the plant, a high-pressure turbine section 20 and low-pressure turbine section 21 are coupled to drive a generator 22. Steam may either flow into the high-pressure steam turbine 20 through an inlet line 23 or it may bypass the steam turbine by flowing through a bypass line 24 via a desuperheater directly to the steam turbine condenser.

Steam turbine 6 is under the control of its own steam turbine control system 25, together with a bypass valve control system 26. Steam turbine control system 25 receives its essential inputs from a speed sensor 27 indicating steam turbine shaft speed, a pressure sensor 28 indicating the common steam header pressure, a transducer 29 indicating high-pressure steam turbine shell and/or first stage temperature, and a transducer 30 indicating the amount of opening of the turbine control valve 31.

The bypass valve control system 26 functions primarily to position the bypass valve 32 in response to pressure variations sensed by pressure transducer 33, or the steam turbine pressure sensor 28 and steam turbine control system 25.

A significant control feedback link between the steam turbine and the gas turbines is via a load transducer 34 measuring the load output of generator 22 connected to the steam turbine through the combined plant control system 18. Loads on all three generators 10, 11 and 22 are measured and corresponding signals are supplied to the combined plant control system.

Turning now to a description of the HRSG associated with each gas turbine, an exhaust stack 35 conducts the hot turbine exhaust gases over heat exchanger tubes, passing successively over superheater tubes 36, evaporator tubes 37, and economizer tubes 38. Exhaust bypass dampers (not shown) may divert gas turbine exhaust around the tubes. A steam drum 39 outside of the stack and a recirculating pump 40 complete the arrangement. The physical arrangement of elements may be seen in U.S. Pat. No. 3,147,742 issued to H. F. May and assigned to the present assignee.

Provision is included also for supplementary firing of the gas turbine exhaust by way of a burner 41. A suitable burner may be seen in U.S. Pat. No. 3,632,286 issued to R. Kegan et al. on Jan. 4, 1972. Either gas or liquid fuel may be used in burner 41, and it need not be the same fuel as that used in the combustion chambers 8 of the gas turbine. Flow of fuel is regulated by a supplementary firing fuel controller 42 according to signals received from the combined plant control system 18. HRSG 4 may have identical elements and control for supplementary firing.

Flow of steam and provision for drainage include various valves, such as superheater outlet drain valves 43, motor operated steam header inlet valves 44, a steam header drain valve 45, a turbine inlet stop valve 46 and a bypass stop valve 47.

Gas Turbine Control System

Figure 2:
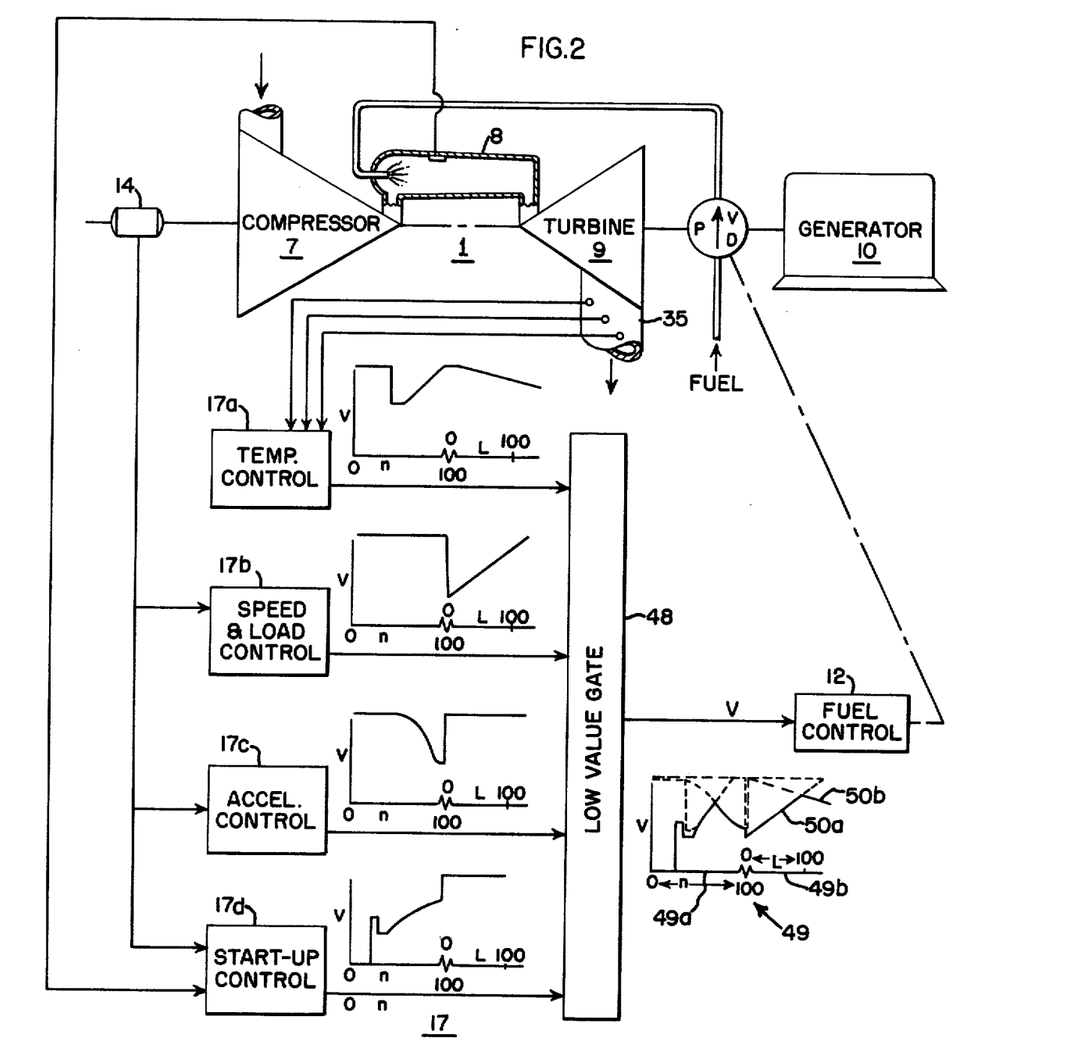
FIG. 2 is a simplified block diagram of a single gas turbine control system.

Referring to FIG. 2 of the drawing, a simplified block diagram of a gas turbine control system 17 for gas turbine 1 is indicated. Reference numbers corresponding to FIG. 1 are indicated with like reference numerals. A more complete description of the gas turbine control system may be seen by reference to U.S. Pat. No.

3,520,133 issued to A. Loft et al on July 14, 1970, assigned to the present assignee and incorporated herein by reference. Briefly, however, control system 17 includes a plurality of closed loop controls such as a temperature control 17a, a speed and load control 17b and an acceleration control 17c. Also included is a startup control 17d responsive to various events normally occurring during startup such as achieving of firing speed and detection of flame in the combustion chambers. The various controllers signal the rate of fuel flow according to the parameter being constrained by each respective controller, and a low value gate 48 selects the lowest fuel flow signal and directs it to the fuel control 12. The graph 49 is a plot of the composite signal with the rate of fuel flow indicated on the vertical axis. The portion 49a of the horizontal axis represents fuel flow during startup from zero to 100 percent of rated speed, and the load L-portion 49b represents fuel flow from zero load to 100 percent of rated load and max permissive load. Of pertinence to the present application, the gas turbine is under the influence of the speed and load control 17b on segment 50a of the graph, but it is under the constraint of the temperature controller 17a shown as segment 50b of the graph. In other words, the gas turbine control increases the rate of fuel flow as additional load is demanded, but at a certain load, which depends upon the ambient temperature and the other settings in the temperature controller 17a, the gas turbine becomes "temperature limited" and cannot be loaded any further, because reduction in the rate of fuel flow commences.

Figure 3:
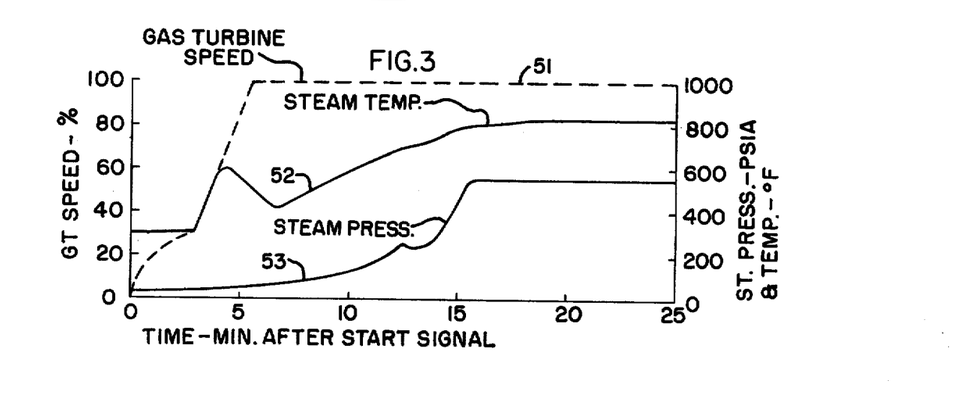
FIG. 3 is a graph indicating the startup characteristics of a single gas turbine and a single heat recovery steam generator supplied by the gas turbine exhaust in unfired mode.

FIG. 3 of the drawing is a graph illustrating the startup characteristic of a single gas turbine with a single HRSG, showing the buildup of steam temperature and pressure in the HRSG. Time is indicated on the horizontal scale, while gas turbine speed is indicated on the left vertical axis and steam conditions on the right vertical axis. The dashed line 51 shows the rapid buildup of gas turbine speed in about 5 minutes. Steam temperature is indicated by curve 52 and steam pressure by curve 53. About 15 minutes after startup of the gas turbine, the HRSG is producing steam at a temperature and pressure suitable to start the steam turbine 6.

In practice, some three to five gas turbines would be started one after another at spaced intervals of about thirty seconds. Their characteristic curves would be similar but displaced along the horizontal time axis.

Steam Turbine Control System

Figure 4:
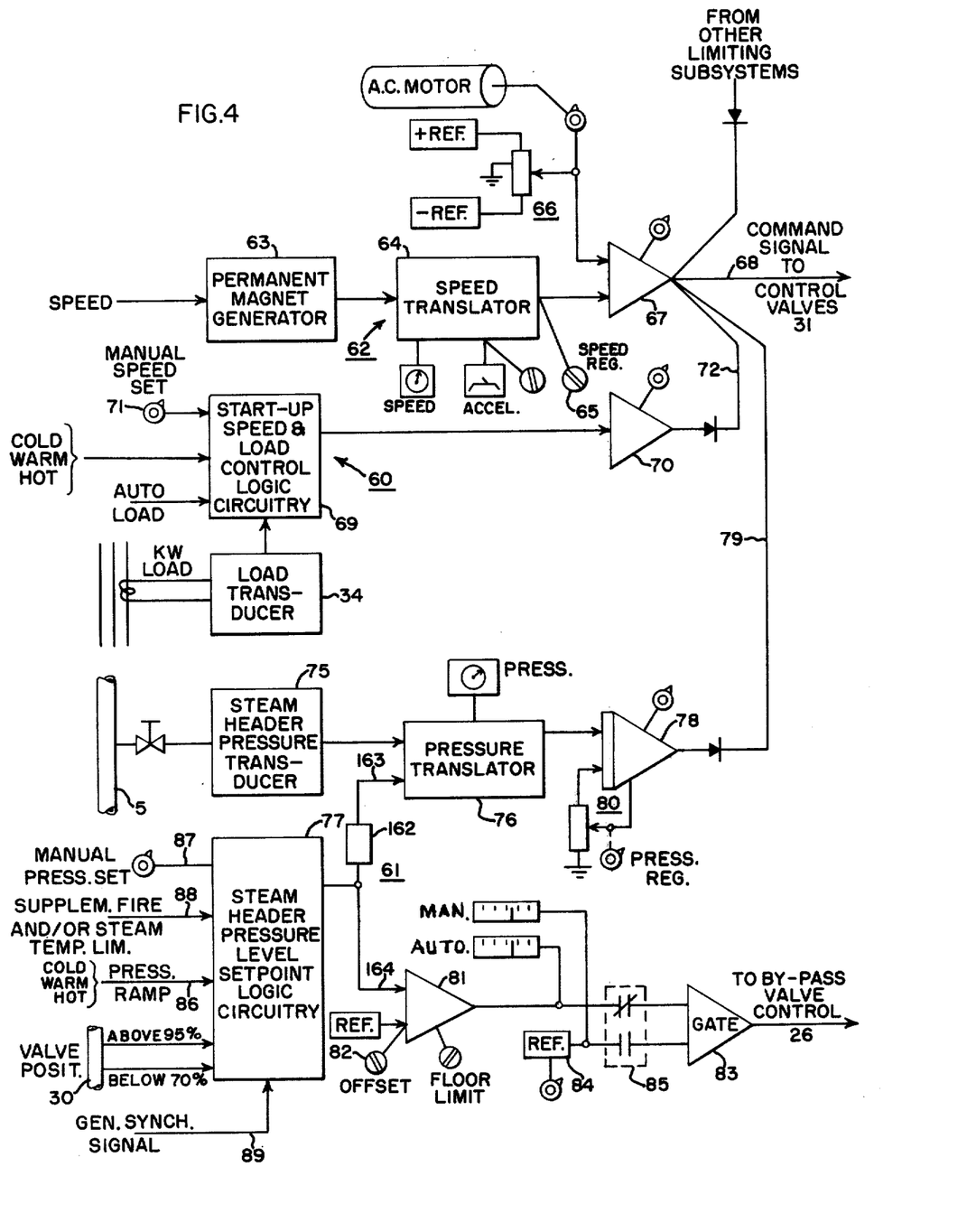
FIG. 4 is a block diagram of an automatic startup speed and load control and a pressure regulating control system for the steam turbine.

Referring now to FIG. 4 of the drawing, an expanded block diagram of the steam turbine control system 25 is shown. Although there are various control subsystems which exercise control over the steam turbine at one time or another, the two basic modes of operation involve the "startup speed and load control" subsystem, shown generally at 60 and the "steam header pressure control" subsystem shown at 61. These two subsystems serve to limit the position of the control valves 31, which are otherwise at all times under the surveillance of the "speed control" subsystem shown generally at 62.

First describing a previously known type of speed control system 62, the steam turbine shaft speed is sensed by a permanent magnet generator 63 which results in a AC signal of a prescribed voltage and frequency at 3,600 rpm. This signal is converted in the speed translator 64 to a DC analog signal inversely proportional to speed near 3,600 rpm with zero volts DC representing 3,600 rpm, positive signals representing speeds below 3,600 and negative signals representing speeds above 3,600. The regulation, or speed error voltage versus speed, is adjustable by means of a speed regulation trim pot 65. The speed error is compared to the speed/load control reference signal developed from a voltage source 66 in a summing operational amplifier designated as speed summer 67. The output signal 68 from speed summer 67 is applied to control valves 31 through a conventional servo to position the valves. Thus, when the signal at 68 is not limited by the other circuits to be described, it serves to set the speed or load on the steam turbine generator, depending on the mode of turbine operation.

During startup, the turbine is brought to speed, synchronized, and loaded to about 20 percent of capability using the startup, speed and load control subsystem 60. Block 69 represents the logic circuitry necessary to develop a limiting signal applied to an amplifier 70. Many inputs to subsystem 60 are eliminated in the figure for purpose of clarity, but necessary inputs include a signal from the load transducer 34 showing actual load on the turbine generator, a manual speed setpoint 71, and signals from the various temperature transducers recording first stage inlet temperature and turbine shell metal temperature. These dictate the startup rate by programming the circuitry to provide a faster startup time and loading rate for a hot turbine than for a cold turbine. The output from amplifier 70 is applied to the speed summer 67 via line 72 and, generally speaking, limits the command signal applied to control valves 31 during the startup and initial loading.

When the steam turbine is operating in the pressure regulating mode, as contemplated by the present invention, the pressure control subsystem 61 serves to limit the output of speed summer 67. Steam pressure in the common steam header 5 is sensed by pressure transducer 75 and a signal corresponding to this actual pressure is transmitted to a pressure translator 76 where it is compared with a reference or pressure level setpoint. In accordance with the present invention, the pressure level setpoint is developed by logic circuitry at 77.

The error signal representing the difference between actual pressure and pressure setpoint is transmitted to an integrating operational amplifier 78 with gain and integrating characteristics, the output of which is fed as a limiting signal over a line 79 to speed summer 67. An adjustable feedback circuit 80 is provided to adjust the pressure regulation of amplifier 78, i.e., the variation in output signal with respect to input signal, or gain of the amplifier. The pressure level setpoint from logic circuitry 77 is also supplied to an amplifier 81 with means at 82 to add an offsetting bias signal, i.e., a setpoint for the steam bypass valve 32 which differs from the setpoint to the pressure translatoor by a selectable quantity. This offset pressure level setpoint is supplied to a gating amplifier 83 with its output serving as a setpoint for the bypass valve control 26. Alternatively, a manually selectable setpoint may be supplied through an adjustable reference source 84, depending upon the position of switches 85.

In accordance with the present invention, the pressure level setpoint is adjusted from one reference pressure level to another in accordance with operating parameters of the steam turbine and conditions of the power plant. The transducer 30 sensing the position of the control valve 31 (see FIG. 1) is arranged to supply a trigger signal when the valve opens to a position above 95 percent of its effective range. A second trigger signal is actuated when the valve closes below 70 percent of its effective range. A second input to logic circuitry 77 shown at 86 is a signal indicating temperature conditions of the steam turbine. Means for manually setting the pressure setpoint are shown at 87. Additional information inputs to logic circuitry 77 are a signal 88 indicating that the supplementary firing HRSG burners are activated or that the steam temperature is at a limiting value, and a signal 89 indicating that the generator 22 has been synchronized to the line.

The pressure setpoint is ramped, i.e. raised or lowered in a selected time interval between selectable reference levels of steam pressure, and remains at the selected pressure level until the valve position moves outside of a selected operating range, which indicates that the pressure level setpoint is to be changed to a new value. In other words, the steam pressure controller is reset in incremental steps to hold various pressure levels from no load to full load in the unfired mode (and to a still higher pressure level for supplementary firing). The resetting means is triggered by valve position. When the steam valve reaches a nominal 95 percent of the wide-open position, the control setpoint commences to ramp up to the next higher pressure level. A reduced steam valve opening, as a result of lower thermal input to the plant, i.e., reduced steam flow, will cause the control valves, 31, to move in the closing direction. The pressure setpoint will commence resetting to a lower pressure level when roughly 70 percent of the control valve wide-open position is reached.

The rate of ramping the pressure level setpoint to new levels is determined by the temperature condition of the turbine through input signal 86. Faster pressure setpoint ramping from one level to the next can take place when the turbine is hot, as from a very recent shutdown.

Single level pressure control of a steam turbine in a conventional automatic extraction steam turbine plant is not new. For example, in U.S. Pat. No. 3,233,413 issued to J. B. Wagner et al. on Feb. 8, 1966, the concept of limiting the output of a speed summer by means of a pressure-responsive error signal is shown. The circuitry for accomplishing pressure regulation is set forth in detail in that patent, which is incorporated herein by reference. However, the subject Wagner patent contemplates single level pressure control of steam turbine initial pressure and/or steam turbine exhaust pressure, rather than provision for significant changes of pressure level setpoints in a multilevel pressure regulating system, as for a combined steam and gas turbine plant.

Steam Pressure Level Setpoint Logic Circuitry

Figure 5:
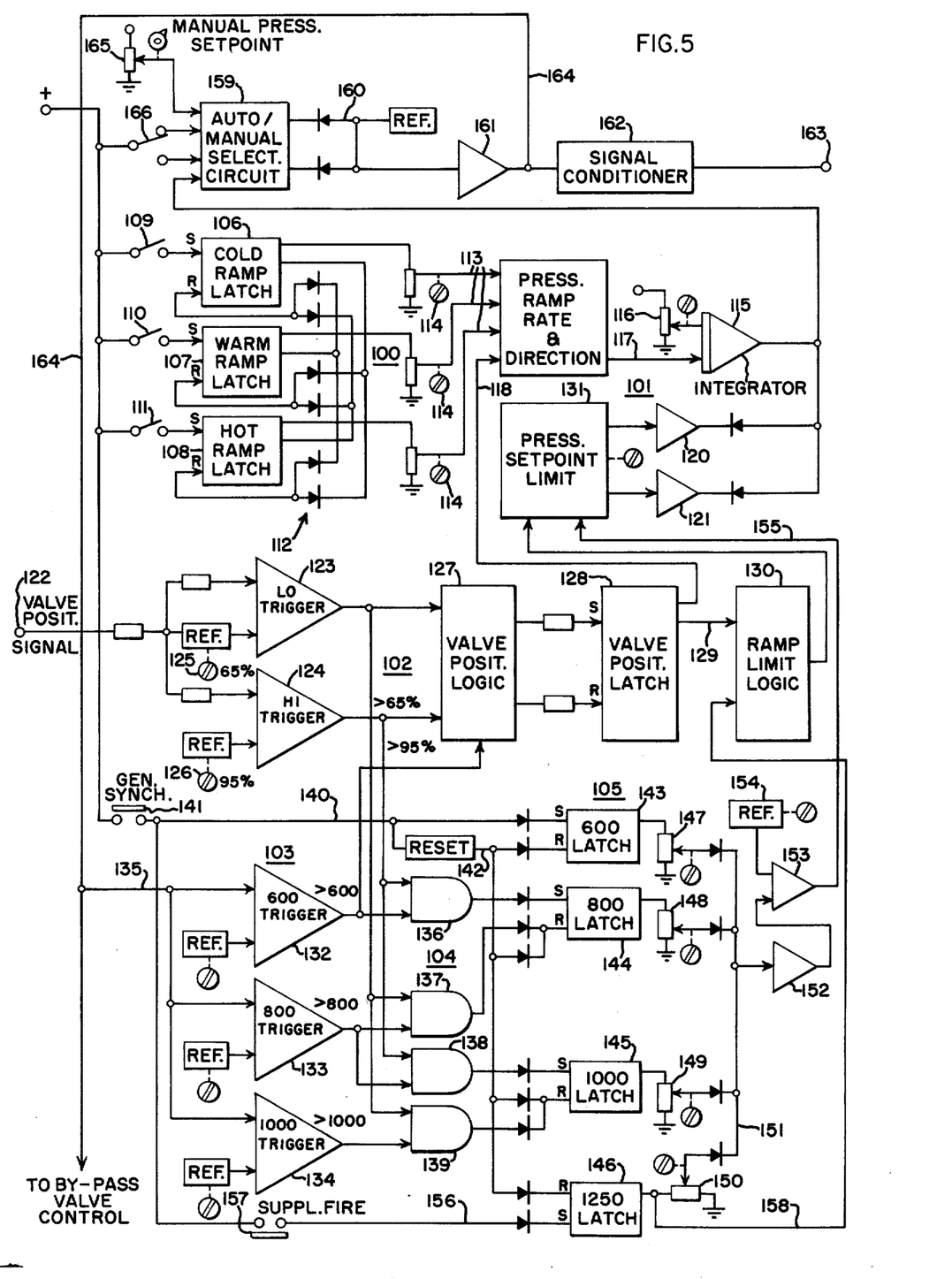
FIG. 5 is a block diagram of the steam header pressure control and pressure setpoint ramping control system associated with the steam turbine.

Reference to the simplified schematic drawing of FIG. 5 will give a more detailed explanation of the steam pressure level setpoint logic circuitry indicated generally as box 77 in FIG. 4. The function of the logic circuitry indicated in FIG. 5 is to ramp the steam pressure setpoint up or down to a new setpoint in response to the steam turbine control valve moving outside of a selected range of operating positions and when other conditions are fulfilled. Generally the logic circuit is divided into a ramp rate latching circuit 100, a pressure ramp rate and limiting circuit 101, a valve position trigger circuit 102, a steam pressure level trigger circuit 103, a condition logic circuit 104, and a pressure setpoint latching circuit 105.

The ramp latching circuit 100 comprises three set/reset latches 106, 107 and 108 actuated by manual or automatic switches 109, 110, 111, respectively. Output of any one latch, such as 106, when it is actuated causes resetting or deactivation of the other two latches such as 107, 108 by means of the interconnected diode circuit 112. A selected one of three signals representing different ramp rates appears on lines 113, the magnitude of which is selectable by means of adjustments 114. An integrator 115 which will provide a time-increasing or decreasing output signal is provided with an adjustable reference input 116 and a second input 117. The reference input 116 causes a time-decreasing output signal unless it is overridden by one of the alternate time-increasing ramp signals 113 when a ramp direction signal 118 actuates a switch connecting lines 113 with an input lead 117 on integrator 115.

Also connected to the output of integrator 115 are a ceiling limiting amplifier 120 and a floor limiting amplifier 121. These serve to set the end points or limits between which device 115 will integrate.

The valve position trigger circuit 102 receives a signal at 122 from the control valve position transducer which is applied to two adjustable trigger devices 123, 124. Low trigger 123 is set by adjusting the reference at 125 so that a signal appears at the output when the effective valve opening is greater than 50 percent, or higher as required by the system. The high trigger 124 is adjusted at 126 so that a signal appears when the valve opening is greater than 80 percent or higher as required by the system. In the particular system shown, the low and high triggers are set at 65 and 95 percent respectively. These signals are fed from the high and low trigger to a logic circuit 127, thus determining whether the valve is within a selected operating range or below or above the selected operating range. Logic circuit 127 supplies signals to valve position latch 128 which, in turn, provides outputs 118 and 129. Output 118, as mentioned previously, determines whether the direction of the ramping signal is increasing or decreasing. Output 129 indicates control valve position to a ramp limit logic circuit 130 which, in turn, supplies a signal to a pressure setpoint limit circuit 131. The setpoint limit logic determines which of the amplifiers 120 or 121 (setting the upper and lower limits on the integrator output) are to be enabled.

Referring now to the steam pressure trigger circuit 103, there are three triggers 132, 133, 134, each comparing a steam pressure setpoint signal appearing at line 135 (same as 164) with an adjustable reference representing a selected steam pressure level setpoint. Each trigger is arranged to give an output signal when the steam pressure setpoint on line 135 exceeds the selected reference input. The signals from the steam pressure trigger circuit 103 and the signals from the valve position trigger circuit 102 are combined in the logic condition circuit 104 comprising AND devices 136–139. The devices 136 and 138 provide an output signal when both of the input conditions are satisfied as indicated by the presence of signals at the two inputs. The devices 137 and 139 provide an output signal when both of the input conditions are not satisfied. The outputs of devices 136–139 are supplied to the set and reset inputs of the pressure setpoint latching circuit 105. Also supplied to the latching circuit 105 is a signal indicating the presence or absence of generator synchronization over a line 140, when a switch 141 is closed. Loss of generator synchronization signal is subsequently indicated on a line 142.

Turning now to the pressure setpoint latching circuit 105, the actual pressure setpoint or reference values at different steam levels are created when latches 143–146 are set to provide a voltage source to adjustable potentiometers 147–150, respectively, each being set to develop an output voltage corresponding to a different selectable steam pressure level. The potentiometers are connected to a common bus 151 through a diode gate arranged so that the highest voltage applied to the input of the gate is furnished to an amplifier 152. Amplifier 152 provides one output to an amplifier 153, together with an adjustable reference 154, which sets a minimum pressure level setpoint. The output of amplifier 153 appearing on a lead 155 is a desired pressure level setpoint toward which the integrator 115 will ramp the signal.

The additional circuitry necessary for a supplementary firing steam pressure level setpoint comprises a lead 156 which is energized when a switch 157 is closed to indicate that the supplementary burners are operating. An additional output lead 158 from latch 146 is connected to the ramp limit logic circuitry 130 serving as an overriding signal regardless of the valve position.

Lastly, the output from integrator 115 is supplied via an automatic/manual selection circuit 159, diode gate 160 to amplifier 161. The output from amplifier 161 passes through a signal conditioner 162 to a junction 163 and becomes the pressure level setpoint for the pressure transistor, 76 in FIG. 4. A second output from amplifier 161 appears on lead 164 which goes to the bypass valve control and also is connected to lead 135 leading to the steam pressure trigger circuit. An alternate input to amplifier 161 is a manual pressure setpoint which is set with an adjustable potentiometer 165 and selector switch 166.

To briefly summarize the operation of the pressure setpoint logic circuit, assume that the pressure setpoint is at 600 psi and a corresponding signal appears at junction 163. A particular ramping rate has been set in ramp rate latching circuit 100 due to closure of one of the switches 109–111. As steam flow increases, the valve moves to a more open position attempting to hold the steam pressure at 600 psi. Eventually the trigger 124 will be actuated at 80 percent or higher of control valve opening and since the steam pressure trigger 132 for 600 psi is also actuated, logic device 136 will set the latch 144 providing a higher voltage on bus 151. This output appearing on lead 155 is a signal corresponding to an 800 psi pressure level setpoint. This signal is supplied to one of the two amplifiers 120, 121 serving as a ceiling on the signal provided by integrator 115 which ramps to the new value. The higher signal representing the new pressure level setpoint passes through the amplifier 161 to junction 163 to complete the cycle. The output from amplifier 161 also is supplied to the steam pressure trigger circuit 103 to set new logic conditions.

Operation of the Pressure Ramping System

Figure 6:
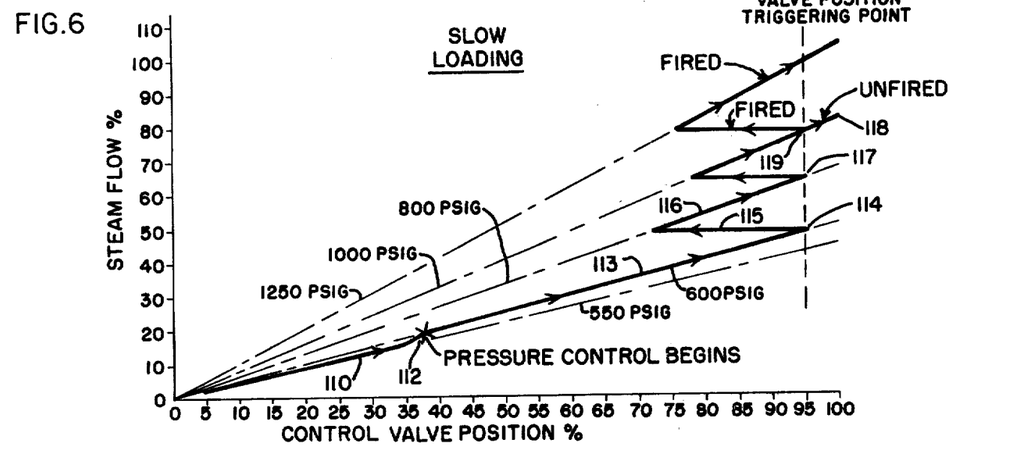
FIGS. 6 and 7 are graphs illustrating loading and unloading characteristics achieved with the steam header pressure control system of FIG. 5 at very slow loading and unloading rates.
Figure 7:
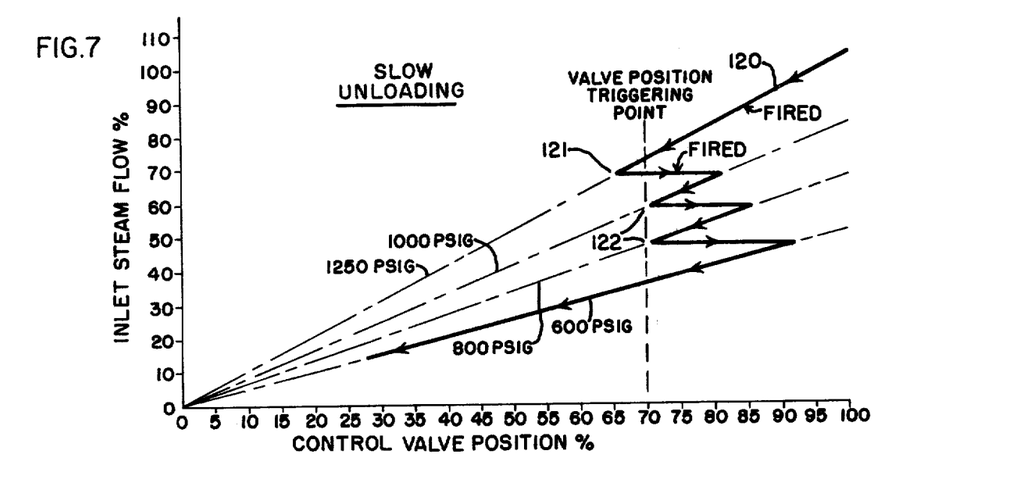
Figure 8:
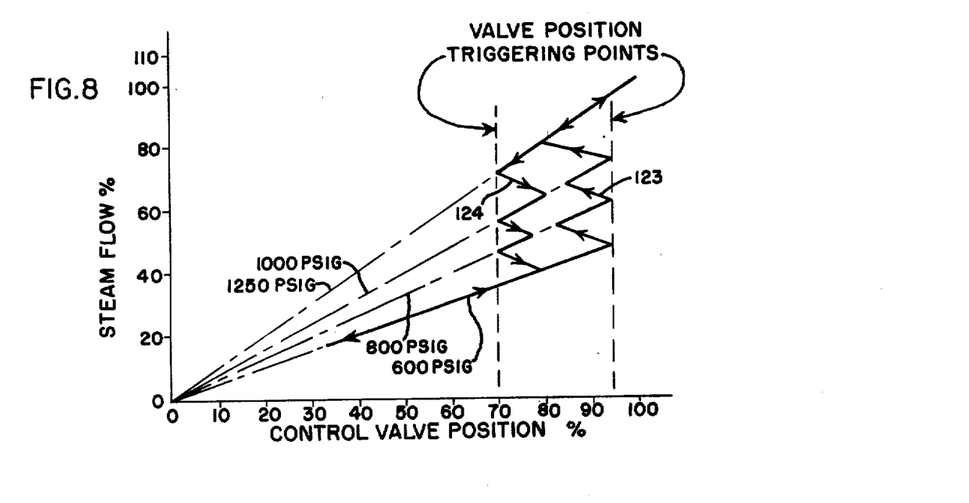
FIG. 8 is a similar graph illustrating loading and unloading characteristics at a faster rate illustrating the dynamic characteristics of the pressure controller.

FIGS. 6–8 are graphs illustrating the variations in steam flow with valve position at different pressure levels, assuming low and high trigger settings of 70 percent and 95 percent valve opening respectively. The horizontal axis shows control valve position as a percent of effective valve opening, while the vertical axis shows steam flow into the turbine. The diagonal lines in phantom show the characteristic of steam flow versus valve position at different steam pressure levels, assuming linear variation of flow with valve opening. For example, at 600 psig, a fully open valve would only pass a little less than half of the steam flow possible at a pressure of 1,250 psig.

FIG. 6 illustrates the characteristic curve followed by a very slow loading of the steam turbine, i.e., increasing the steam flow therethrough, assuming that the flow is held constant during ramping of the pressure level setpoint to the next level. It is assumed that the pressure is regulated by the bypass valve along segment 110 of the curve until pressure regulation by control valves 31 commences at point 112. The pressure setpoint is held at 600 psig and, as additional steam is generated in the HRSG, the valve must gradually open to maintain the pressure. Thus the steam flow increases along the line segment 113 until the valve position reaches 95 percent effective opening at point 114. At this point, the logic control circuitry commences ramping the pressure level setpoint to the next level, or 800 psig. Line segment 115 assumes that the flow stays constant as the pressure of the steam increases which is brought about by reduction of the control valve opening. As soon as the higher pressure level setpoint is reached, and assuming that additional steam is being generated by the HRSG under the influence of increasing gas turbine exhaust temperature, the control valve commences opening again to maintain the pressure setting until again the control valve reaches 95 percent effective opening, triggering a repetition of the cycle.

The point 118 would be the maximum steam flow possible with 100 percent control valve opening in an unfired system. However, if there is provision for supplementary firing, the pressure setpoint may again be ramped to a still higher level when the valve reaches 95 percent opening at point 119, depending upon the operating conditions desired. The graph shown in FIG. 6 assumes that the plant is designed for supplementary firing of the HRSG's.

FIG. 7 is a graph similar to FIG. 6, except that it represents reductions in load on the steam turbine. If the HRSG is in a fired condition, it preferably remains so as the pressure setpoints are ramped to each successive lower level. As less steam is generated, the control valve commences closing along line segment 120. The first point reached which triggers reduction of the pressure level setpoint to a lower level is not control valve position, but is determined by temperature, this point being indicated at 121. (In some cases control valve position could trigger the first reduction of steam pressure level setpoint.) Subsequent reductions of pressure level setpoints to lower levels are initiated by a control valve position equal to 70 percent of effective opening as shown at points 122.

Firing is preferably maintained during initial reductions of pressure level setpoints and flow, if the turbine was previously in a supplementary fired mode. The reason for the change in control philosophy is due to the moisture problem associated with bucket erosion which can occur in the steam turbine if pressure is relatively high when temperature is relatively low. There is a minimum safe operating temperature for which the pressure should be ramped down. Thus on load reduction, temperature drop will initiate pressure setpoint reduction and if further reduction in load occurs, further pressure setpoint reduction will be accomplished by once again using valve position as an input to maintain pressure control.

FIG. 8 is a curve similar to FIGS. 6 and 7, but combining the curves to illustrate both loading and unloading in a more dynamic situation. Loading is illustrated by the zig-zag line segments 123 on the right which are initiated by a selected control valve open position and terminated by higher pressure levels, while zigzag line segments 124 on the left represent unloading and are initiated by moderate control valve opening positions and terminated by successively lower pressure level setpoints.

Operation of the Combined Plant Control System

Fundamental to an understanding of the operation of the control system is the knowledge that the combined plant load is assigned only to the gas turbine controls when operating in the unfired mode. The gas turbines respond immediately to changes in load settings and, subsequently as their exhaust temperatures increase, with greater steam generation by each HRSG, the steam pressure has a tendency to increase in header 5. This is held constant, however, by opening the steam turbine control valves to add load to the steam turbine. Therefore, the contribution to the overall plant load by the steam turbine-generator 22 "follows" the load contributions made by the gas turbine generators 10, 11. As the steam turbine load increases, due to the increase steam flow to the steam header 5, the gas turbines can then reduce their separate loadings to maintain the overall gross plant load at the requested amount. Meeting the requested load on the plant is determined by the summing of the load tranducer signals from all three generators.

For example, referring to FIG. 1 of the drawing, if an increased plant load setting is introduced to the combined plant control system, this increase load setting is assigned among the various gas turbine control systems such as 17, more fuel is added to each gas turbine whereupon its exhaust temperature increases, more steam is supplied to header 5 and the steam turbine control valve 31 continues to open to maintain pressure constant. When it reaches a 95 percent open valve, the steam turbine control system 25 ramps the pressure setpoint to a higher level and the steam turbine commences controlling pressure by its control valve movements at this level.

When each respective gas turbine has reached a temperature - limited condition, it can no longer add fuel to increase the exhaust temperature. Thereupon supplementary firing is initiated at the operator's option through the combined plant control system by initiating fuel flow to the supplementary burners 41. Initiation of supplementary firing also causes the pressure level setpoint to ramp to a new higher level and the steam turbine control system continues to control steam pressure at this level. Although supplementary firing is a less efficient type of operation, it enables the combined plant to meet high load demands for short periods of time.

Thus there has been described an improved control system for a combined steam turbine and gas turbine power plant which enables a minimum of interfacing controls between the steam turbines and the gas turbines, in which the steam turbine follows the gas turbines in load assignment, and which operates in multi-pressure level regulating modes to obtain more efficient and orderly loading and unloading of the components.

While there has been described what is considered to be the preferred embodiment of the invention, other modifications will become apparent to those skilled in the art and it is desired to secure in the appended claims all such modifications as fall within the true spirit and scope of the invention.

What is claimed is:

1. A control system for a combined cycle power plant including at least one gas turbine driving a first load and a steam turbine driving a second load; a heat recovery steam generator for generating steam from the gas turbine exhaust heat and a steam header interconnecting the heat recovery steam generator and the steam turbine; the control system further comprising:
   a. a gas turbine control system for regulating a fuel supply to the gas turbine in accordance with a load demand setpoint supplied thereto;
   b. a steam turbine control system for positioning a steam turbine control valve in response to the steam pressure in said steam header;
   c. first and second load transducers for measuring, respectively, the loads on said gas turbine and said steam turbine; and,
   d. a combined power plant control system for comparing a load demand setpoint for the combined plant with the sum of the signals from the first and second load transducers to provide a combined plant load error, and to adjust the load setpoint of said gas turbine control system in accordance with the combined plant load error.

2. The control system recited in claim 1 wherein the steam turbine control system regulates the steam pressure in said header by means of said control valve at a plurality of discrete steam pressure levels, said steam turbine control system further including means to change from one discrete pressure level to another in response to the position of the control valve.

3. The control system recited in claim 1 further comprising at least one additional gas turbine driving a load and having a load transducer, said additional gas turbine having a separate gas turbine control system associated therewith to supply fuel to the additional gas turbine in response to a separate load demand setpoint supplied thereto; and, said combined power plant control system being arranged to compare the load demand setpoint for the combined plant with the sum of the signals from the respective load tranducers to provide the combined plant load error, and to adjust the load setpoints of said respective gas turbine control systems in response to the combined plant load error.

4. The combination according to claim 1 and further including supplementary firing means arranged to burn fuel in the gas turbine exhaust to augment steam generation in the heat recovery steam generator when the gas turbine control system limits further fuel flow to the gas turbine.

5. A control system for a combined cycle plant of the type having at least one gas turbine, a steam turbine, a heat recovery steam gnereator disposed to generate steam from the gas turbine exhaust and a steam header receiving steam from the heat recovery steam generator, said control system comprising:

a control valve for varying the flow of steam through the steam turbine from said steam header, means for sensing the pressure of steam in said steam header and providing an output pressure signal, control means receiving said output pressure signal and positioning said control valve to regulate the pressure in said header about a pressure level setpoint within a selected operating range of the control valve, and means responsive to control valve movement outside of said operating range and operative to change the pressure setpoint of said control means to a new pressure level.

6. The combination according to claim 5, wherein said control means ramps the pressure setpoint at a selectable rate to a higher pressure setpoint when said control valve opens beyond a selected position.

7. The combination according to claim 5, wherein said control means causes the pressure setpoint to ramp to a selected lower level at a selectable rate when the control valve closes beyond a selected position.

8. The combination according to claim 5, wherein said control means is arranged to change the pressure setpoint to a new pressure level at a rate dependent upon a measured operating condition of the steam turbine other than valve position.

9. The combination according to claim 5, wherein said control system includes a first amplifier arranged to position said control valve in accordance with a selected operating speed of the steam turbine, and a second amplifier responsive to a selected pressure in the steam turbine arranged to limit the output of the first amplifier and thereby override the position of the control valves dictated by said amplifier.

10. A combined cycle power plant and control system comprising:

at least one gas turbine driving an electrical generator, a steam turbine driving an electrical generator and having a control valve for varying the amount of steam flowing through the steam turbine, a heat recovery steam generator disposed to generate steam from the heat of the gas turbine exhaust, a steam header receiving steam from the heat recovery steam generator, a steam turbine control system arranged to regulate the steam pressure in said header by means of said control valve, a gas turbine control system arranged to supply fuel to the gas turbine in accordance with a gas turbine load setpoint supplied thereto, first and second means providing signals responsive respectively to the loads produced by said gas turbine-driven generator and by said steam turbine-driven generator, and a combined plant control system arranged to compare a load demand setpoint for the combined plant with the sum of the signal from said first and second load responsive means and to adjust the load setpoint of said gas turbine control system in response to the combined plant load error.

11. The combination according to claim 10, and further including an additional gas turbine connected to drive an additional electrical generator having third load responsive means and including an additional heat recovery steam generator connected to said steam header, said gas turbine having an additional gas turbine control system associated therewith arranged to supply fuel to the additional gas turbine in response to a second gas turbine load setpoint, and said combined plant control system being arranged to adjust first and second gas turbine load setpoints to said respective gas turbine control systems in response to the combined plant load error.

12. The combination according to claim 10 and further including supplementary firing means associated with said heat recovery steam generator and arranged to burn fuel in the gas turbine exhaust to augment steam generation in the heat recovery steam generator when the gas turbine control system limits further fuel flow to the gas turbine.

13. The combination according to claim 12 further including a supplementary firing fuel controller for adjusting the fuel flow to said supplementary firing means in response to the combined cycle plant load error when the gas turbine control system limits further fuel flow to the gas turbine.

* * * * *